US007933958B2

(12) United States Patent
Carr et al.

(10) Patent No.: US 7,933,958 B2
(45) Date of Patent: Apr. 26, 2011

(54) REAL-TIME BLOG INTERACTION

(75) Inventors: Derek W. Carr, Fairless Hills, PA (US);
Peter P. Eacmen, West Roxbury, MA (US); Ronny A. Pena, New York, NY (US); Rodney Smith, Raleigh, NC (US); Ajamu A. Wesley, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 1511 days.

(21) Appl. No.: 10/863,324

(22) Filed: Jun. 8, 2004

(65) Prior Publication Data
US 2005/0273503 A1 Dec. 8, 2005

(51) Int. Cl.
G06F 15/16 (2006.01)
(52) U.S. Cl. .................... 709/206; 709/219
(58) Field of Classification Search ............ 709/206, 709/219
See application file for complete search history.

(56) References Cited

U.S. PATENT DOCUMENTS

| 6,360,250 B1* | 3/2002 | Anupam et al. | 709/204 |
| 6,631,378 B1* | 10/2003 | Rosinus et al. | 707/100 |
| 7,266,368 B2* | 9/2007 | Yamauchi et al. | 455/416 |
| 2002/0143819 A1* | 10/2002 | Han et al. | 707/513 |
| 2003/0229670 A1* | 12/2003 | Beyda | 709/206 |
| 2004/0122901 A1* | 6/2004 | Sylvain | 709/206 |
| 2005/0004993 A1* | 1/2005 | Miller et al. | 709/207 |
| 2005/0132056 A1* | 6/2005 | Creamer et al. | 709/227 |
| 2005/0160167 A1* | 7/2005 | Cheng et al. | 709/224 |
| 2005/0198149 A1* | 9/2005 | Johnson et al. | 709/206 |
| 2006/0036689 A1* | 2/2006 | Buford et al. | 709/206 |

FOREIGN PATENT DOCUMENTS

| EP | 1 022 664 A2 | 7/2000 |
| WO | WO 02/19097 A1 | 7/2002 |

OTHER PUBLICATIONS

*Merging IM With Blogging*/Christopher Saunders/Copyright Jul. 3, 2003/www.instantmessagingplanet.com/public/article.php/2231511.
*Motime, blog+IM is online*/Tipic/More Than Instant Messaging/Copyright 2000-2003.
*IM compatability closer to reality*/Robert Lemos/CNETNews.com/Copyright 2002/http://news.com.com/2100-1023-964317.html.

(Continued)

*Primary Examiner* — Tonia L Dollinger
*Assistant Examiner* — Mark D Fearer
(74) *Attorney, Agent, or Firm* — Steven M. Greenberg, Esq.; Carey Rodriguez Greenberg & Paul, LLP

(57) ABSTRACT

The present invention is a system, method and apparatus for for real-time blogging. In a preferred aspect of the invention, a real-time bi-directional blogging system can include a blog and a bi-directional syndication interface to the blog. Importantly, an instant messaging system can be coupled to the syndication interface of the blog. The instant messaging system of the present invention can include a chat server and at least one chat client. Notably, a bot can be coupled to the chat server. The bot can be programmed to communicate blog postings received in the chat server to the chat client or clients. The bot can be further programmed to communicate responses to the blog postings received from the chat client or clients to the blog through the syndication interface.

7 Claims, 2 Drawing Sheets

OTHER PUBLICATIONS

*Method and system for a remote notification service for a multi-server architecture*/The Delphion Integrated View/Copyright 1997.
*RSS Syndication and Aggregation*/Jupitermedia Corporation/Copyright 2003.
*IM+*/Shape Services Limited/Instant Messaging Planet/Copyright 2003.
*What is Site Syndication*?/Blogger/Date Unknown.

\* cited by examiner

REAL-TIME BLOG INTERACTION

BACKGROUND OF THE INVENTION

1. Statement of the Technical Field

The present invention relates to Web logs and more particularly to the real-time posting of data to a Web log.

2. Description of the Related Art

A "Blog" can be defined as a regularly updated Web log. The prototypical blog can include information relating to a specific topic. For instance, in many cases a blog has been used as a daily diary regarding the personal life of the author, the political views of the author, or a social commentary reflecting the viewpoint of the author. The roots of "blogging" can be traced to the mid-1990's. Still, the identity of the first blogger remains unclear, as the art of blogging did not really take hold until the year 1999. Nevertheless, the original "weblogs" could be characterized as link-driven Web sites containing the personal commentaries of one or more authors. In this regard, the first blogs can be viewed as human guided Internet Web tours. While initially thought of as diaries or online journals, blogs since have evolved into the latest, fresh Web content.

Today, blogging represents an emerging collaboration technology that greatly simplifies the sharing of ideas and thoughts in a communal bulletin board environment. Specifically, blogging can simplify the posting of Web content by automating the publishing of Web log content. To that end, blogs provide a means for an individual or group to maintain a Web site where posting new content is accomplished via a Web browser allowing content to be aggregated easily. In many circumstances, blog posts can be complimented with commentary from the original poster as well by others who visit the blog.

Much of the explosion of web-based commentary via blogging has been fueled by the addition of "Really Simple Syndication" (RSS) publishing features in blogging applications. RSS technology allows blog sites to be constantly updated with "feeds" from related blog sites, building a vast interconnected network of blogged information—a social construct of connected commentary. RSS is an XML-based format that allows the syndication of content ranging from lists of hyperlinks to blog postings. To enable the syndication of content, a Web site can publish an RSS feed, or channel. Once a feed becomes available, content browsers can regularly fetch the RSS feed to receive the most recently published content in the channel.

Presently, the management of a blog has been greatly simplified through the use of blog management tools which shield the management process from contributing authors. In particular, instant messaging technologies have been incorporated into blogging technologies to provide a unidirectional means of updating the content of a blog through the familiar interface of the instant messaging client. Nevertheless, while the ability to update the content of a blog real time or in near real-time has been supported through the use of instant messaging technologies, the ability to support real-time bidirectional collaboration in the blogging environment has not yet materialized. Yet, within a business context, blog postings may require time-sensitive responses depending upon the level of urgency associated with a post. Real time communication within corporate networks in general can be accomplished via conventional instant messaging technologies. As blogging technologies become integrated within the corporate portal, however, the need will arise to support the integration of instant messaging technologies with other business collaboration technologies such as the blog.

SUMMARY OF THE INVENTION

The present invention addresses the deficiencies of the art in respect to the management of Web log data and provides a novel and non-obvious method, system and apparatus for real-time blogging. In a preferred aspect of the invention, a real-time bi-directional blogging system can include a blog and a bi-directional syndication interface to the blog. The syndication interface can include, as an example, a port type for registering a subscriber to the blog and a port type for bi-directionally communicating content between the blog and a chat server disposed in the instant messaging system. In this regard, the syndication interface can comport with RSS.

Importantly, an instant messaging system can be coupled to the syndication interface of the blog. The instant messaging system of the present invention can include a chat server and at least one chat client. Notably, a bot can be coupled to the chat server. The bot can be programmed to communicate blog postings received in the chat server to the chat client or clients. The bot can be further programmed to communicate responses to the blog postings received from the chat client or clients to the blog through the syndication interface. In any case, at least one other communications system can be coupled to the syndication interface such that the resulting bi-directional linkage can enable collaboration across with both synchronous and asynchronous communications systems.

A real-time blogging method can include the steps of receiving a blog comment posting and routing an instant message containing the blog comment posting to at least one chat client. The method further can include the steps of receiving an instant message response to the routed instant message and translating the instant message response for posting in a blog. Subsequently, the translation can be forwarded to the blog for posting. Preferably, the translating step can include the step of translating the instant message to a syndicated format.

The routing step can include the steps of determining whether the chat client or clients are communicatively coupled to a chat server for receiving an instant message. The blog comment posting can be cached for future routing to chat client or clients until the chat client or clients become communicatively coupled to the chat server to receive the instant message. Once the chat client or clients become communicatively coupled to the chat server to receive the instant message, the instant message containing the blog comment posting can be routed to the chat client or clients. In this regard, the routing step can include translating the blog comment posting from a syndicated format to an instant message and routing the instant message to the chat client or clients.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being

DETAILED DESCRIPTION OF THE PREFERRED EMBODIMENTS

The present invention is method, system and apparatus for real-time bi-directional interoperation between a blog and an instant messenger. In accordance with the present invention, a blog can be configured for bidirectional interoperation with an instant messaging system. Preferably, a blog can be configured for syndication through a syndication interface. A chat server can register for the syndicated content of the blog. As posts to the blog are received in the chat server, the chat server can pass the blog postings to registered listeners in a chat session as an instant message. Subsequently, instant messaging responses to the blog postings can be converted from instant messaging content to a blog posting and applied to the blog through the syndication interface of the blog.

Figure 1:
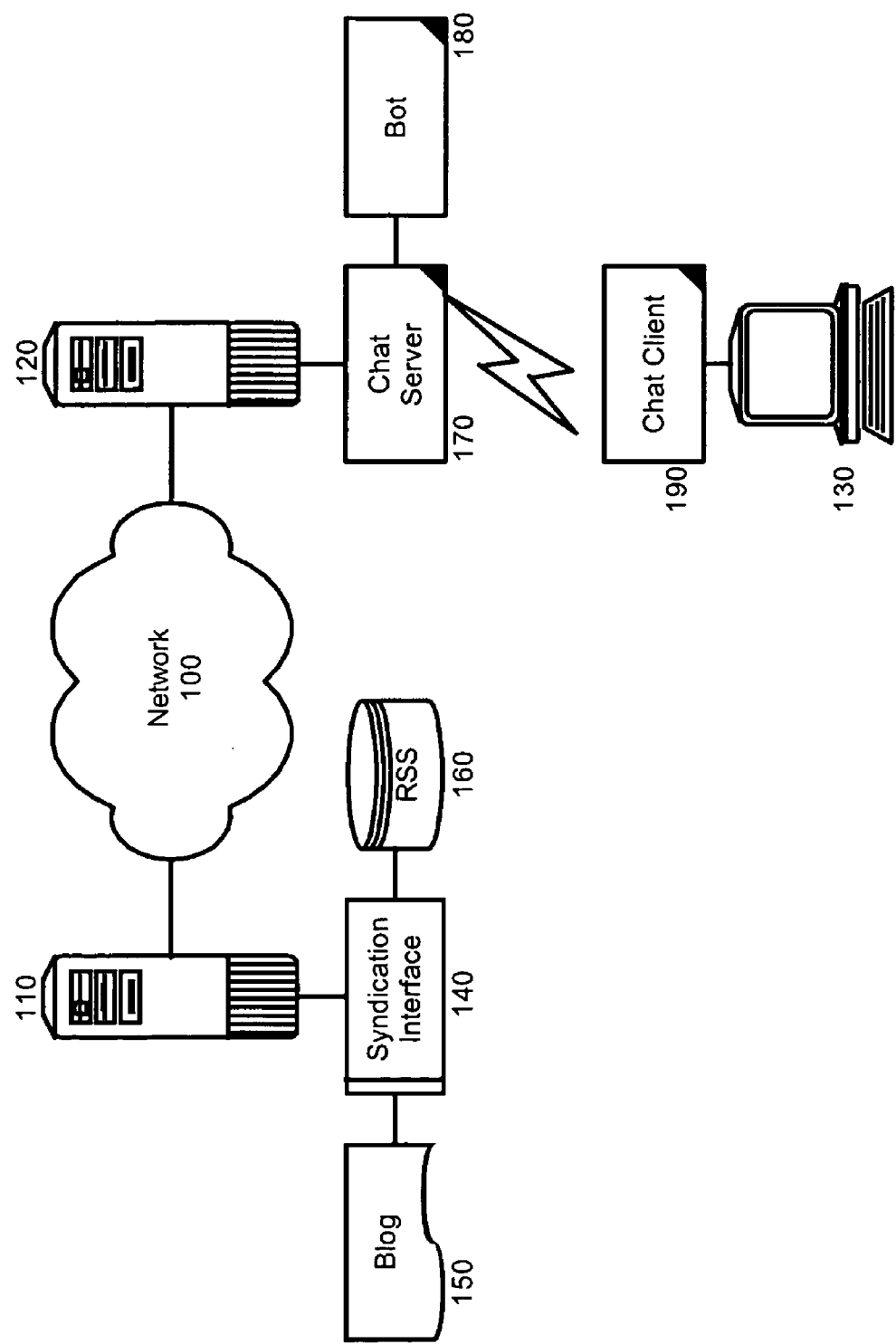
FIG. 1 is a schematic illustration of a system for real-time bi-directional interoperation between a blog and an instant messenger; and, FIG. 2 is a flow chart illustrating a process for real-time bi-directional interoperation between a blog and an instant messenger.

In more particular illustration of a preferred aspect of the present invention, FIG. 1 is a schematic illustration of a system for real-time bi-directional interoperation between a blog and an instant messenger. The system can include a blog server 110 configured to manage a blog 150. The blog server 110 can include a syndication interface 140 to the blog 150 through which external blog content consumers can register for a channel feed to postings in the blog 150. In this regard, the blog 150 can be packaged as RSS content 160 for distribution through the syndication interface 140 to registered subscribers to the RSS content 160.

The system also can include an instant messaging system 120 coupled to the blog server 110 over a computer communications network 100. The instant messaging system 120 can include a chat server 170 communicatively linked to one or more chat clients 190 hosted in corresponding host computing devices 130 (only one chat client and host computing device shown for simplicity of illustration). As it will be apparent to the skilled artisan, the instant messaging system 120 can be configured to host real-time chat sessions between different host computing devices 130 through corresponding chat clients 190.

Importantly, a bot 180 can be coupled to the chat server 170. The bot 180 can be programmed to convert the RSS content 160 of the blog 150 to an instant message for consumption by the chat clients 190 where the chat clients 190 have been associated with a chat server 170 which has registered through the syndication interface 140 to receive the RSS content 160. In this regard, the syndication interface 140 can include a Web service interface for providing bidirectional RSS syndication of blog content 150.

An exemplary syndication interface follows:

```
<portType name = "DuplexSyndication">
    <operation name = "RegisterForSyndication">
        <input message = "tns:RegisterForSyndicationInput" />
        <output message = "tns:RegisterForSyndicationOutput" />
    </operation>
    <operation name = "RSS_Sink">
        <input message = "tns:RSS_SinkInput" />
```

-continued

```
        <output message = "tns:RSS_SinkOutput" />
    </operation>
</portType>
```

Using the syndication interface 140, external computing processes, including the chat server 170 can register to receive syndicated blog content 150 over the computer communications network, and the chat server 170 can post blog comments to the blog content 150 through the syndication interface 140.

Figure 2:
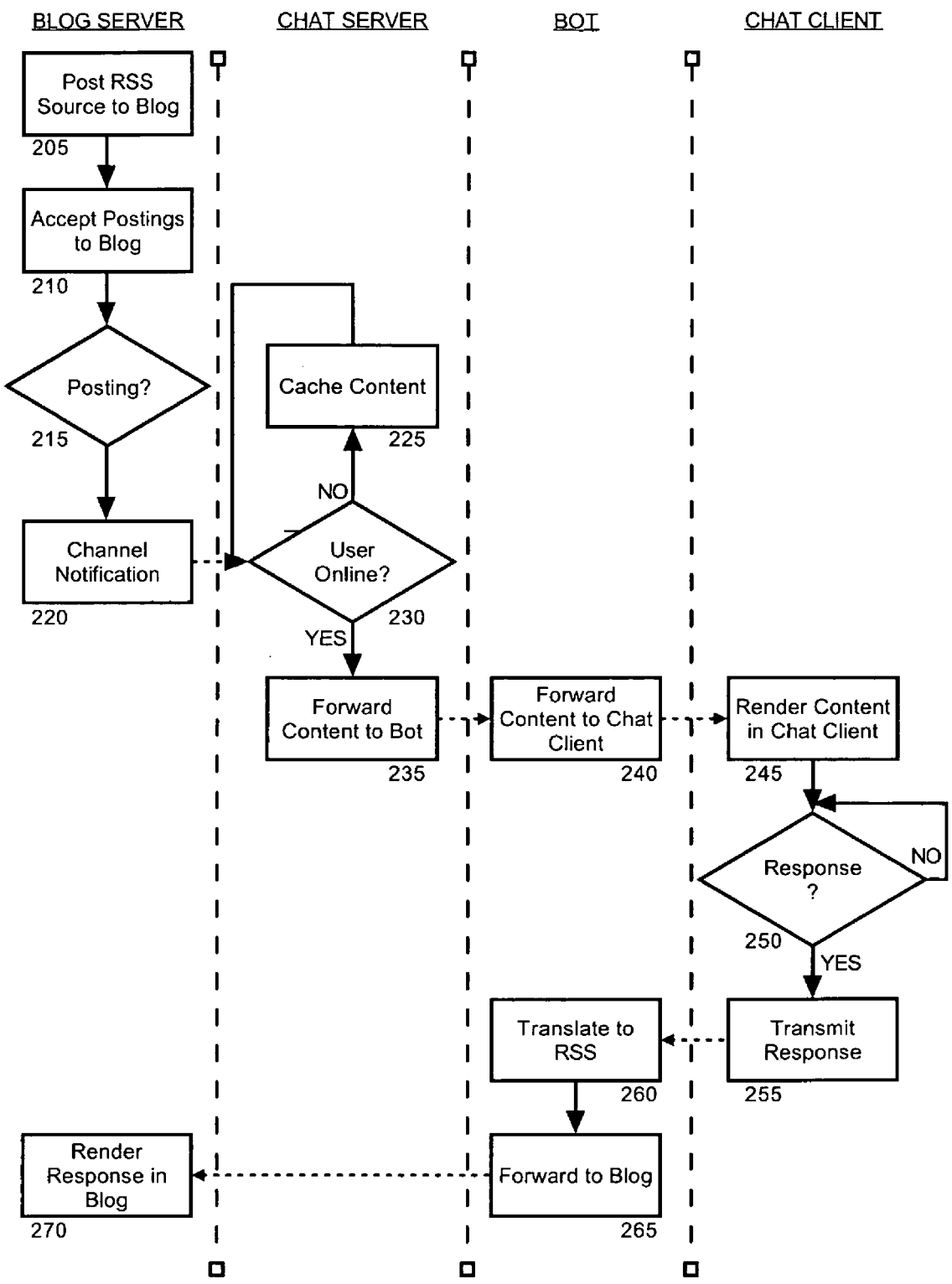

The principal of interleaving blog content 150 with instant messages in the instant messaging system 120 of FIG. 1 can be further explained according to the flow chart of FIG. 2. Specifically, FIG. 2 is a flow chart illustrating a process for real-time bi-directional interoperation between a blog and an instant messenger. Beginning in block 205, the blog author can register a document that is marked as RSS source. The registered document can include an end point reference which identifies at least one chat server. Subsequently, in block 210 the blog server can accept postings to the blog. If in decision block 215 postings are added to the blog, in block 220 the RSS subscription can activate with the RSS document being forwarded to the chat server.

In decision block 230, it can be determined if at least one designated user is connected to the chat server such that the designated user can receive instant messages via a chat client disposed within the instant messaging system. If not, in block 225 the content of the RSS document can be cached until such time as the designated user becomes connected to the chat server. In this regard, the content can include the comment posted to the blog, a posting identifier and an indication of the author of the comment. Once the designated user becomes connected, in block 235 the tuple of comment, identifier and indication can be forwarded to the bot.

The bot can receive the tuple in block 240 and the bot can route the tuple to the chat client. Notably, the bot can augment the tuple with additional temporal information such as the time at which the tuple is transmitted to the chat client. In block 245, the chat client can receive the tuple and the comment and the identity of the author of the comment can be rendered in the chat client as if the comment and identity were part and parcel of an instant message.

The chat client can accept a response to the comment. If in decision block 250 the chat client processes a response, in block 255 the response can be transmitted to the bot. In block 260, the bot can receive the response and the bot can package the response into an RSS document. In block 265, the bot can forward the RSS document to the blog server by invoking the syndication interface of the blog server. Once the blog server has received the RSS document, in block 270 the blog server can extract the response and the blog server can post the response to the blog as a comment to the blog.

Importantly, by facilitating a bi-directional linkage between the instant messaging system and the blog, the collaborative medium of the blog can be integrated with the collaborative medium of the instant messaging system to provide a real-time capability to the otherwise batch processing mode of the blog. Moreover, it will be recognized by the skilled artisan that the bi-directional linkage between the instant messaging system and the blog can be used to facilitate collaboration between various disparate clients, for instance VoiceXML clients, e-mail clients, chat clients, short text messaging clients and pagers. In particular, the bi-directional linkage can enable asymmetric collaboration across both synchronous and asynchronous mediums.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A real-time blogging method comprising the steps of:
   receiving a blog comment posting; and,
   routing an instant message containing said blog comment posting to at least one chat client, wherein said routing step comprises the steps of:
   determining whether said at least one chat client is communicatively coupled to a chat server for receiving the instant message;
   caching said blog comment posting for future routing to said at least one chat client until said at least one chat client becomes communicatively coupled to said chat server to receive said instant message;
   routing said instant message containing said blog comment posting to said at least one chat client when said at least one chat client becomes communicatively coupled to said chat server to receive said instant message; and
   registering to receive blog comment postings in a syndicated format, wherein
   said receiving step comprises the step of receiving said blog comment posting responsive to receiving a notification of said blog comment posting through said registration.

2. The method of claim 1, further comprising the steps of:
   receiving an instant message response to said routed instant message;
   translating said instant message response for posting in a blog; and,
   forwarding said translation to said blog for posting.

3. The method of claim 2, wherein said translating step comprises the step of translating said instant message to a syndicated format.

4. A machine readable hardware storage having stored thereon a computer
   program for real-time blogging the computer program comprising a routine set of instructions
   which when executed by a machine cause the machine to perform the steps of:
   receiving a blog comment posting; and,
   routing an instant message containing said blog comment posting to at least one chat client, wherein said routing step comprises the steps of:
   determining whether said at least one chat client is communicatively coupled to a chat server for receiving the instant message;
   caching said blog comment posting for future routing to said at least one chat client until said at least one chat client becomes communicatively coupled to said chat server to receive said instant message;
   routing said instant message containing said blog comment posting to said at least one chat client when said at least one chat client becomes communicatively coupled to said chat server to receive said instant message; and
   registering to receive blog comment postings in a syndicated format, wherein
   said receiving step comprises the step of receiving said blog comment posting responsive to receiving a notification of said blog comment posting through said registration.

5. The machine readable hardware storage of claim 1, further comprising the steps
   of:
   receiving an instant message response to said routed instant message;
   translating said instant message response for posting in a blog; and,
   forwarding said translation to said blog for posting.

6. The machine readable hardware storage of claim 5, wherein said translating step comprises the step of translating said instant message to a syndicated format.

7. The machine readable hardware storage of claim 4, wherein said routing step comprises the steps of:
   translating said blog comment posting from a syndicated format to an instant message; and,
   routing said instant message to said at least one chat client.

* * * * *